United States Patent
Buckeridge

[15] 3,671,834
[45] June 20, 1972

[54] REVERSER PROTECTIVE CIRCUIT
[72] Inventor: Roger M. Buckeridge, Downers Grove, Ill.
[73] Assignee: Westinghouse Air Brake Company, Pittsburgh, Pa.
[22] Filed: March 9, 1970
[21] Appl. No.: 17,599

[52] U.S. Cl. ........................................318/293, 307/141.8
[51] Int. Cl. .....................................................H02h 7/097
[58] Field of Search ........................307/125–127, 138, 307/141.8, 135, 136; 318/284, 285, 293; 317/11 A

[56] References Cited

UNITED STATES PATENTS

| | | |
|---|---|---|
| 3,284,648 | 11/1966 | Koppelmann..........................307/136 |
| 2,437,197 | 3/1948 | Ivester..................................318/293 |
| 2,606,312 | 8/1952 | Rogers..................................318/293 |
| 3,046,462 | 7/1962 | Hampson..............................318/293 |

Primary Examiner—Bernard A. Gilheany
Assistant Examiner—W. E. Duncanson, Jr.
Attorney—John E. McRae

[57] ABSTRACT

A motor reverser protective electrical circuit for a reversible motor or motors in which a control relay is employed to prevent energization of a reverser activating control circuit whenever the motor is under load. This circuit protects against "throwing" the reverser, primarily in the event a main line relay contactor, supplying power to the motor, is stuck or welded closed.

7 Claims, 2 Drawing Figures

INVENTOR.
Roger M. Buckeridge

REVERSER PROTECTIVE CIRCUIT

BACKGROUND OF THE INVENTION

Because of limited space and the demand for high power, modern mining machines necessitate the use of electrical components having a minimum physical size yet arranged to handle maximum electrical loads. A reverser is employed in the present invention which is a minimum size having contactors which will accept full load when closed but are unable to withstand opening and closing under load. Accordingly, care must be exercised to reverse the direction of the motors only when they are under no load, and protect against "throwing" the reverser in the event a main line contactor becomes inoperative in a closed position.

In the past, circuitry protected against "throwing" the reverser under load as long as all main line contactors worked satisfactorily, but there was no protection inherent in the circuit to protect against "throwing" the reverser in the eventuality of a welded or stuck contactor.

BRIEF SUMMARY OF THE INVENTION

The present invention is directed to a protective electrical circuit for a motor reverser, arranged to reverse the direction of current flowing through an electric motor. In the preferred embodiment a motor circuit is provided to supply electrical power to a pair of reversible motors by means of main line contactors which selectively place the motors in series or parallel with one another. A series arrangement is provided when first starting the motors and when the motors are to operate at reduced speed. In this instance, the voltage is reduced to one-half of the full line voltage. A parallel connection is used when the motors are to run at full speed.

When the motors are to be reversed, the main line contactors are all opened and the reverser thrown. Thus, the reverser contacts are not required to open and close under load. The present invention deals with the serious problem of safeguarding the reverser contacts from arcing and surge currents caused by malfunctioning main line contactors. Should the contacts "weld" or stick in a closed position, the circuit through the reverser and to the motors would be under load at a time when the circuit is expected to be under no load. Reversing the motors at this time would produce catastrophic failure to the reverser.

The means to safeguard against this possibility includes a control relay having a coil in the main line circuit which can be energized only when all the main line contactors are in an open position. Energizing the control relay coil activates a control relay contactor. This contactor is in a control circuit which actuates the reverser. If the control relay coil is de-energized by reason of a closed main line contactor, the control relay contactor will be opened and therefore the control circuit will be unable to actuate the reverser.

A current direction limiting diode is placed in series with the control relay coil to eliminate any possibilities of energizing the control relay coil due to several main line contactors sticking in a closed position which could otherwise energize the relay coil.

Accordingly, one of the principal objects of this invention is to provide a minimum size reverser for mining machine motors and a protective circuit therefor.

Another object of this invention is to provide a motor reverser protective circuit arranged to safeguard motor reversers from damage caused by operation of the reverser under load.

These and other objects of the invention will become obvious from a reading of the following description of the invention.

The invention is illustrated more or less diagrammatically in the accompanying figures wherein.

Figure 1:
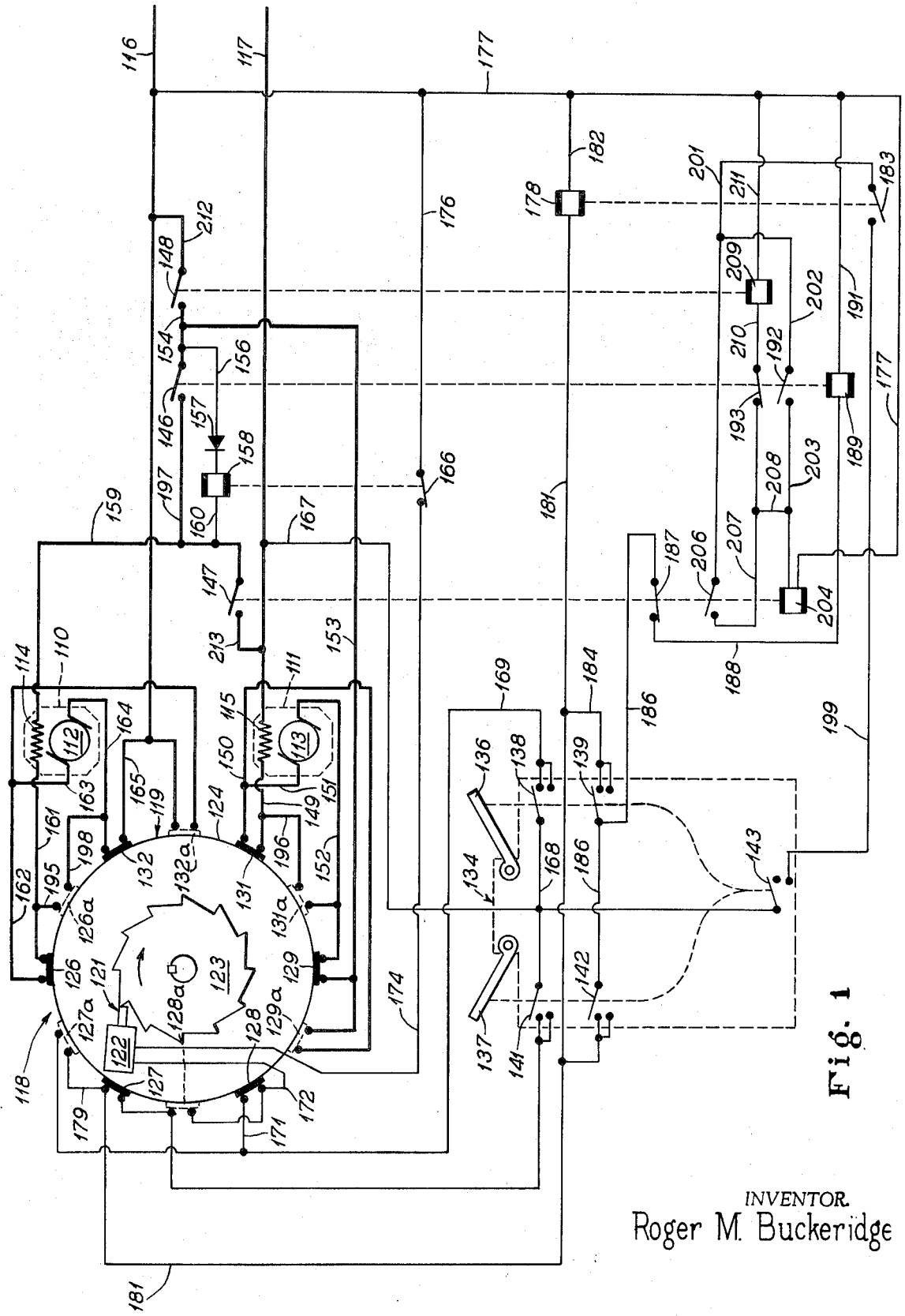
FIG. 1 is a schematic wiring diagram of a motor reverser protective electrical circuit arranged in accordance with the concepts of the invention.

In the embodiment of my invention illustrated in FIG. 1, a reversible motor 10, which may be used to propel a mine vehicle, is diagrammatically shown as including an armature 11 and a series field 12.

Main line conductors 13 and 14, which are connected with an electrical power source, are shown as supplying electric power to the motor 10 through a motor reversing means 16. The reverser 16 consists of a solenoid driven rotary switch 17 and a solenoid drive means 18. When the drive 18 is activated it moves the rotary switch 17 in one direction, step by step, to alternately change the motor direction with each successive step.

The solenoid drive means 18 includes a solenoid actuator 21 and a ratchet 20 which drives the rotary switch 17 one step each time the solenoid 21 is energized. The solenoid driven rotary switch 17 includes rotary drum 22 having four electrical contacts 23, 24, 25 and 26 mounted thereon.

A direction control switch means 27, comprising foot pedals 28 and 29, and switches 31, 32, 33 and 34, is arranged to control the switching sequence of the rotary switch 17. Foot pedal 28 is arranged to operate the motor 10 in a first direction and pedal 29 is arranged to operate the motor in an opposite direction. Switches 31 and 32 are closed by the pedal 28 and switches 33 and 34 are closed by pedal 29.

With specific reference to the condition as shown in FIG. 1, the contacts of main line contactor or relay 36 are in their normally open position. A by-pass line 38, having a control relay coil 39 therein, provides a by-pass circuit around the open contactor 36. The small current required by the coil 39 leaks through the motor series field 12, line 41, drum contact 23, lines 42 and 43, the armature 11, lines 44 and 46, contact 24, line 47 and to the main line conductor 13. In this situation there is obviously insufficient current to power the motor 10.

Control relay coil 39 is energized and normally open relay contacts 48 are closed. Now, as seen in FIG. 1, when the foot pedal 28 is operated, switches 31 and 32 will close. A reversing control circuit will now be completed through lines 52, 53, switch 31, line 54, contact 26, lines 56, 57, through solenoid 21, line 58, relay contacts 48, line 59 and to the main line conductor 13. Completing this circuit energizes solenoid 21 of the motor reversing means 16, causing the rotary switch 17 to rotate one step. Drum contacts 23, 24, 25 and 26 will no longer complete the circuit just described. Instead, now these contacts move to the positions shown in broken lines in FIG. 1, and identified as 23a, 24a, 25a and 26a.

Now the circuit comprising the main line conductor 14, line 52, switch 32, line 61, contact 24a, line 62, contactor coil 37, line 63 and the main line conductor 13 is complete. Coil 37 is then energized, closing main line contactor 36 in the main line conductor 14 connected to the motor 10. The motor circuit is then completed through series field 12, lines 41, 66, drum contact 26a, lines 46 and 44, armature 11, lines 43 and 67, contact 23a, line 68 and the main line conductor 13. The motor is now in operation.

At a time when main line contactor 36 closes, the control relay coil 39 is short circuited and the relay contacts 48, in the reversing control circuit, will open. Further, the relay coil 39 cannot close contacts 48 until main line contactor 36 again opens.

Now assume foot pedal 28 is released and switches 31 and 32 open, coil 37 will then be de-energized and main line contact 36 will open, thereby shutting off current to the motor 10. Shortly after main line contactor 36 opens, the previously described by-pass circuit will again cause the relay contacts 48 to close. If the foot pedal 28 is again operated, the reversing control circuit cannot be completed since contact 26, connecting the lines 54 and 56 together, has moved to the dotted line position as indicated by 26a on the drawing. Consequently, the motor will start up in the same direction it had been rotating.

However, if foot pedal 29 is operated, closing switches 33 and 34, a reversing control circuit comprising the main line conductor 14, lines 52 and 71, switch 33, line 72, contact 25a, line 57, solenoid actuator 21, line 58, relay contact 48, line 59 and main line conductor 13 will be completed and the solenoid drive 18 will rotate the rotary switch 17 to reverse the armature connections to the main line conductor 14, thus causing the armature 11 of the motor 10 to rotate in an opposite direction.

Occasionally, when operating machines with high power requirements, main line contacts will stick or weld in a closed position, placing the circuit under constant load. In this event, if an attempt is made to reverse the motor direction, the motor reversing means cannot function, since in this condition the control relay coil 39 will be shorted out and the relay contacts 48 will be open whereby the reversing control circuit will be inoperative.

Thus, it may readily be seen that the motor reversing means 16, which is a no-load device, cannot be "thrown" to reverse the direction of the motor when the main line motor circuit is under load. If the reverser could be operated under load, it will likely destroy itself.

Figure 2:
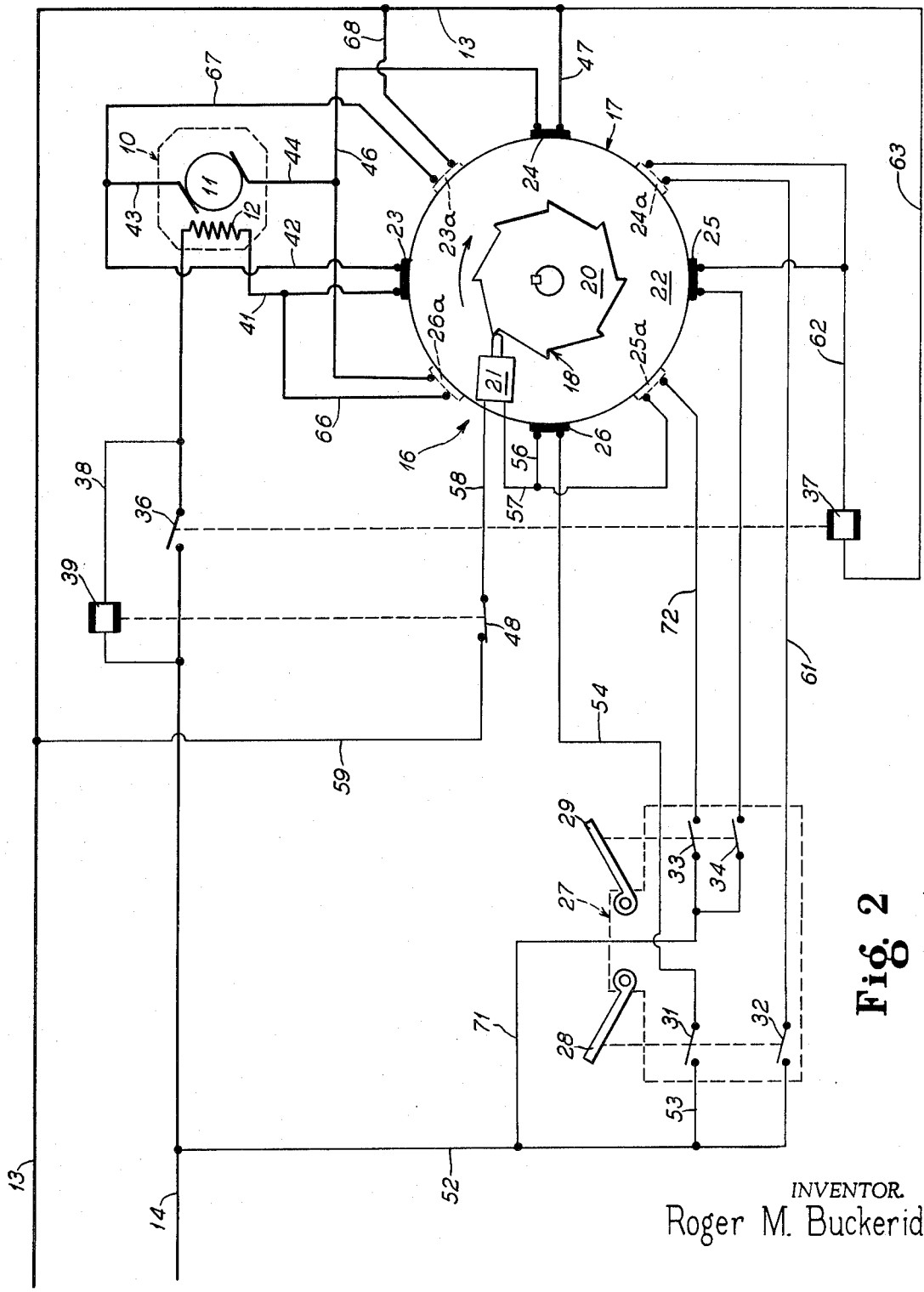
FIG. 2 is a schematic wiring diagram of a motor reverser protective electrical circuit, similar to FIG. 1 but showing two electric motors which are arranged for series or parallel operation.

Now referring to FIG. 2, a pair of reversible motors 110 and 111, which may be used to propel a mine haulage vehicle such as a shuttle car, are arranged for operation in series or parallel connections relative to one another. The motors are connected in series for low speed operation and in parallel for high speed.

In addition to the pair of motors shown, there may be other motors connected in parallel with the motor 110 and other motors connected in parallel with the motor 111, however the operation of the circuit relative to the present invention will be generally the same.

The motors 110 and 111 are diagrammatically shown as including an armature 112 and 113 and a series field 114 and 115 respectively.

Main line conductors 116 and 117, which are connected with an electrical power source, are shown as supplying electric power to the motors 110, 111 through a motor reversing means 118. The motor reversing means 118 comprises a solenoid driven rotary switch 119 and a solenoid drive means 121. When the drive is actuated, it moves the rotary switch step-by-step to the required positions. The solenoid drive 121 includes a solenoid actuator 122 and a ratchet 123 which drives the rotary switch 119 one step each time the solenoid 122 is energized.

The solenoid driven rotary switch 119 includes a rotary drum 124 having six electrical contacts 126, 127, 128, 129, 131, and 132 mounted thereon. The rotary switch 119 provides 12 switching connections, six of which are operating or closed connectings and six are non-operating or open connections at any given position of the rotary drum 124.

A direction control switch means 134 having foot pedals 136 and 137 is arranged to control the switching sequence of the rotary switch 119. Foot pedal 136 is arranged to operate the motors 110 and 111 in a first direction and pedal 137 is arranged to operate the motors in an opposite direction. Switches 138 and 139 are closed by pedal 136 and switches 141 and 142 are closed by pedal 137. Pedals 136 and 137 each have two operating positions and either position of the pedals will close their related switches. A switch 143 is operated by either pedal 136 or 137 but will only close in the second position of the pedals.

With specific reference to the condition of the circuit shown in FIG. 2, main line contactors 146, 147 and 148 are shown in their normally open position. A by-pass circuit, comprising main line conductor 117, series field 115, line 149, drum contact 131, lines 150 and 151, armature 113, line 152, contact 129, lines 153, 154 and 156, diode 157, control relay coil 158, lines 160 and 159, series field 114, line 161, contact 126, lines 162 and 163, motor armature 112, line 164, contact 132, line 165 and main line conductor 116, provides an electrical circuit around the open contactors 146, 147 and 148. This circuit energizes the relay coil 158, however the small current required by this coil is insufficient to power the motors 110, 111.

Now assume foot pedal 136 is depressed to its second operating position. The first position will close switches 138 and 139 and the second position continues to hold 138 and 139 closed and also closes switch 143. Now, with control relay coil 158 energized, control relay contacts 166 will close as shown in FIG. 2. A reversing control circuit will thus be established to drive the motors in an opposite direction relative to the direction the motors had previously been running. The reversing control circuit includes the main line conductor 117, lines 167, 168, switch 138, lines 169, 171, drum conductor 128, line 172, solenoid 122, line 174, control relay contacts 166, lines 176 and 177 and the main line conductor 116. Completing this circuit energizes solenoid 122 of the motor reversing means 118, causing the rotary switch 119 to rotate or advance one step. Now contacts 126, 127, 128, 129, 131 and 132 will no longer complete the circuits just described. Instead, these contacts move to the dotted line position shown on the drawing and identified as 126a, 127a, 128a, 129a, 131a and 132a.

Now, with the foot pedal 136 still in the second position, in which the switches 138, 139 and 143 are all closed, a control circuit will be established to first start the motors in series connection with one another and after a suitable time delay provide a parallel connection for the motors. Line 167, connected to the main line conductor 117, is connected to a time delay relay coil 178 by means of line 168, switch 138, line 169, drum contact 127a, lines 179, 181 and the time delay coil 178. The circuit is completed with lines 182, 177 and the main line conductor 116. Time delay coil 178 will then be energized and after a suitable delay of 3 or 4 seconds will close time delay contacts 183. However, before contacts 183 can close, a circuit will be established leading from the line 181 to the main line conductor 116, by means of line 184, switch 139, line 186, normally closed contactor 187, line 188, main line contactor relay coil 189, line 191 and line 177. This branch circuit energizes the relay coil 189 and will close the main line contactor 146. It will also close control circuit contactor 192 and will open the normally closed contactor 193.

The motors 110 and 111 are now connected in series by means of the following circuit: main line conductor 117, series field 115, lines 149 and 196, drum contact 131a, line 152, armature 113, lines 151 and 150, contact 129a, lines 153, 154, main line contactor 146, which is now closed, lines 197, 159, series field 114, lines 161 and 195, drum contact 126a, lines 198, 164, armature 112, lines 163 and 162, contact 132a, line 165 and the main line conductor 116.

The operation of the circuit to this point is identical with the operation of the circuit at a time when the foot pedal 136 is moved only to its first position, with the exception that switch 143 would be open and the motors would remain in a series connection. A series connection is always provided when first starting the motors and when the motors are to operate at a reduced speed. However, since the foot pedal 136 is still in its second position and the switch 143 is closed, after the time delay relay coil 178 closes the time delay contacts 183, the motors will be connected in parallel. At that time a circuit is completed through the switch 143, line 199, contacts 183, lines 201 and 202, contactor 192, line 203, main line relay coil 204, line 177 and the main line conductor 116. When coil 204 is energized, main line contactor 147 will close, control contactor 206 will close and the normally closed contactor 187 will open. The series activating circuit is now opened and relay coil 189 will be de-energized. Main line contactor 146 will open, contactor 192 will open and 193 will close.

The circuit which maintains coil 204 energized now includes contacts 183, line 201, contactor 206, lines 207, 208 and 203, coil 204, line 177 and the main line conductor 116. Further, line 207 connects to contactor 193 (which is now closed), line 210, main line relay coil 209, lines 211 and 177, and the main line conductor 116. Coil 209 is now also energized and will close main line contactor 148. The motors 110 and 111 are then across the line in parallel with one another and will operate at full speed. This circuit comprises main line conductor 117, series field 115, lines 149 and 196, drum contact 131a, line 152, armature 113, lines 151 and 150, contact 129a, lines 153 and 154, main line contactor 148, line 212 and the main line conductor 116 for the motor 111; and main line conductor 117, line 213, main line contactor 147, line 159, series field 114, lines 161 and 195, drum contact 126a, lines 198, 164, armature 112, lines 163 and 162, contact 132a, line 165 and the main line conductor 116, for the motor 110. Thus, both motors will be operating at full line voltage.

Now, assume the foot pedal 136 is released, switches 138, 139 and 143 will open and main line relay coils will de-energize, opening the main line contactors 146, 147 and 148 shutting off the motors. The by-pass circuit will again energize the control relay coil 158, closing contactor 166 and the circuit is then prepared to reverse the motors. If, however, foot pedal 136 is again actuated, the motors will of course be driven in the same direction since the reversing means 118 cannot be activated because of an open contact in the solenoid actuator circuit. That is, drum contact 128 has shifted to the 128a position and lines 171 and 172 are no longer connected. Only when foot pedal 137 is actuated will the reversing circuit be complete and the reversing means 118 bring about the switching sequence which will pass current through the armatures 112, 113 in an opposite direction, causing the motors to operate in a reverse direction relative to the direction they had been rotating.

At a time when any one of the main line contactors 146, 147 or 148 is stuck or welded closed, control relay coil 158 will be short circuited and, therefore, cannot close control relay contactor 166. With contacts 166 open, motor reversing means 118 cannot operate. In the event both main line contactors 147 and 148 should stick or weld closed, a circuit comprising main line conductor 117, line 213, main line contactor 147, lines 159 and 160, control relay coil 158, lines 156 and 154, main line contactor 148, line 212 and the main line conductor 116, could energize the control relay coil 158. It will be noted, however, that the coil current is flowing in an opposite direction to that which flows under normal operating conditions. To prevent this from happening, the diode 157 is placed in the circuit to pass current in the normal operating direction, but to block the current in the wrong direction.

Thus, it will be seen the motor reversing means 118, being a no load device, is protected by the present invention against "throwing" the reverser under load, primarily in the event a main line relay contactor, or contactors, supplying electrical power to the motors, is stuck or welded closed.

Although a preferred embodiment of the invention has been illustrated and described, it will be apparent to those skilled in the art that modifications can be made within the scope of the invention. Accordingly, it is intended that the scope of the invention not be limited by the foregoing illustrative description, but solely by the scope of the hereinafter appended claims.

I claim as my invention:

1. In a motor reversing circuit including an electrical power source,
   a reversible motor,
   power contacts for said motor,
   control means to close said contacts,
   a reverser, having reversing contacts arranged in series with said power contacts to reverse the polarity of power applied to said motor when activated, and
   means to render the reverser inactive whenever said power contacts are closed.

2. In a motor reversing electrical circuit comprising:
   a pair of reversible electric motors,
   a main line power circuit for said motors including:
   main line contactors arranged to electrically connect the motors in series or parallel with one another,
   a motor reverser having reversing contacts arranged for series connections with the main line contactors, for reversing the direction of current flow through the motors,
   a control circuit for said motors including:
   control means arranged to actuate the reverser and the main line contactors,
   a control relay arranged to limit operation of the reverser to the period in which all of the main line contactors are open, whereby the reversing contacts will not be subjected to opening and closing under load.

3. The structure of claim 2, wherein a diode is arranged to limit energization of the control relay to an electrical current flowing in only one direction.

4. The structure of claim 2, wherein the control means includes:
   a direction control switch means arranged to initiate control circuit response for forward or reverse and series or parallel operation of the motors,
   an actuating means for said reverser, responsive to the direction control switch means, and
   relay coils responsive to the direction control switch means to selectively close the main line contacts.

5. The structure of claim 4, wherein the control relay includes:
   a control relay coil in the main line power circuit, energizable only when all main line contacts are open,
   a control relay contact in the control circuit, placed in series with the actuating means, to permit operation of the actuating means only when the control relay coil is energized.

6. The structure of claim 5 further including a diode in series with the control relay coil, to limit energizing the control relay coil to an electrical current flowing in one direction only.

7. In an electrical motor circuit comprising: a pair of reversible electric motors,
   a main line power circuit for said motors including:
   a first main line contact arranged to place the motors in series with one another,
   second and third main line contacts arranged to place the motors in parallel with one another,
   a motor reverser for reversing the current flow through the motors,
   a control circuit for said motors including:
   a direction control switch means arranged to initiate control circuit response for forward or reverse and series or parallel operation of the motors,
   an actuating means for said reverser, responsive to the direction control switch means,
   a first relay coil responsive to the direction control switch means to close the first main line contact,
   a time delay means
   second and third relay coils responsive to the direction control switch means and subject to the time delay means to close the second and third main line contacts whereby the second and third contacts will close subsequent to the closing of the first main line contact,
   a control relay comprising:
   a control relay coil in the main line power circuit, energizable only when all main line contacts are open,
   a control relay contact in the control circuit, placed in series with the actuating means, to permit operation of the actuating means only when the control relay coil is energized, and
   a diode in series with the control relay coil regulating direction of current flowing through the control relay coil.

* * * * *